United States Patent
Faria et al.

[15] 3,655,575
[45] Apr. 11, 1972

[54] CATHODOLUMINESCENT PHOSPHOR COMPOSITIONS

[72] Inventors: Sixdeniel Faria, Towanda; Lyle K. Williams, Wysox, both of Pa.

[73] Assignee: Sylvania Electric Products Inc.

[22] Filed: Feb. 2, 1970

[21] Appl. No.: 7,450

[52] U.S. Cl. ....................................................252/301.6 S
[51] Int. Cl. ..........................................................C09k 1/12
[58] Field of Search ............................................252/301.6 S

[56] References Cited

UNITED STATES PATENTS

| | | | |
|---|---|---|---|
| 2,623,858 | 12/1952 | Kroger | 252/301.6 S |
| 2,951,814 | 9/1960 | Destriau | 252/301.6 S |
| 3,010,909 | 11/1961 | Klasens et al. | 252/301.6 S |

*Primary Examiner*—Tobias E. Levow
*Assistant Examiner*—J. Cooper
*Attorney*—Norman J. O'Malley, Donald R. Castle and William H. McNeill

[57] ABSTRACT

Cathodoluminescent phosphors exhibiting improved properties and that provide colored emission throughout a substantial portion of the visible range of colors, are disclosed that consist essentially of a zinc sulfide and cadmium sulfide host material having a Zn:Cd weight ratio of about 2:98 to about 98:2 and an activator material having an amount of silver of from about 50 to about 300 ppm by weight based on the weight of the host material and from about 75 to 600 ppm of aluminum on the same basis. The blue-emitting phosphor compositions consisting essentially of a host having a Zn:Cd ratio of from about 90:10 to about 97:3 and an activator material having from about 100 to about 300 ppm of silver and from about 75 to about 150 ppm of aluminum are found to have extremely high brightness. Additionally the green-emitting phosphor compositions consisting of a host having a Zn:Cd weight ratio from about 55:45 to about 65:35 and an activator material having from about 50 to about 300 ppm of silver and from about 75 to about 300 ppm of aluminum is also an extremely bright phosphor. Red-emitting phosphors having a Zn:Cd weight ratio of from about 25:75 to about 15:85 and levels of silver and aluminum of from about 100 to 300 ppm are also disclosed.

5 Claims, 1 Drawing Figure

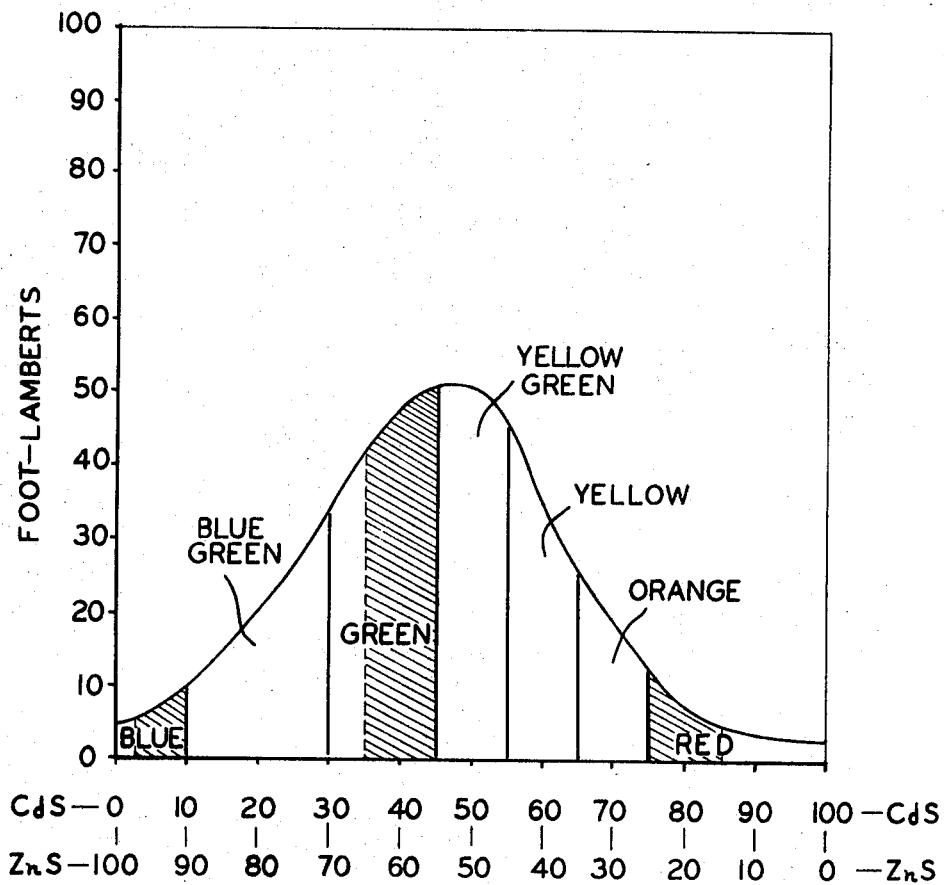

CATHODOLUMINESCENT PHOSPHOR COMPOSITIONS

REFERENCES TO RELATED APPLICATIONS

In U.S. Pat. application Ser. No. 8041, and Ser. No. 7977, filed concurrently herewith, processes are disclosed that are capable of producing the phosphors of this invention as well as other phosphors having a sulfide host. In U.S. Pat. application Ser. No. 7622, now U.S. Pat. No. 3,602,753, filed concurrently herewith, there is disclosed a new cathode ray tube employing some of the phosphors of this invention.

BACKGROUND OF THE INVENTION

This invention relates to phosphor compositions. More particularly it relates to improved cathodoluminescent phosphor compositions having a zinc cadmium sulfide host and that emit over a substantial portion of the visible spectrum when excited by cathode rays.

Zinc cadmium sulfide phosphors using various activators are known. Probably the most widely used is the silver-activated zinc cadmium sulfide green-emitting phosphor used in color television. Additionally, various mixtures of zinc cadmium sulfide phosphors using various activators are used in black and white television. Other mixtures of zinc cadmium sulfides are used in special cathode ray tubes. Various activators and co-activators for zinc cadmium sulfide phosphors are known, such as silver, copper, nickel and chlorine.

In luminescent materials the terms "activator" and "co-activator" are used. The term "activator" is descriptive of an ion, generally metallic, that is believed to replace some of the cations in the matrix of the host material and functions therein to cause the material to luminesce under specific conditions of excitation. The term "co-activator" is descriptive of a material that affects the luminescent properties of a phosphor in a different manner by either aiding in the diffusion of the activator or by promoting crystal growth. Certain materials can, to some degree, function as both an activator or a co-activator as described above. Although it is believed that certain materials used in this invention function as activators or co-activators, for purposes of simplification, the material used to provide at least the two beforementioned functions will be referred to as an activator material.

In many cathode ray tubes different chemical compounds are used for the desired emission color of the phosphors. For example, in color television zinc sulfide activated with silver and co-activated with chlorine is one of the blue-emitting phosphors used. As mentioned previously, silver-activated zinc cadmium sulfide has generally been used as the green-emitting phosphor. The red-emitting phosphors recently used are phosphors having certain rare earth hosts such as yttrium vanadate, yttrium oxysulfide, yttrium or gadolinium oxides that are activated with europium. Another red-emitting phosphor previously used was a zinc cadmium sulfide silver-activated having a ratio of Zn to Cd of about 20:80. As can be appreciated, the variety of different phosphor compositions result in problems of recovery, cross-contamination and the like when more than one color of emission is desired. It is believed, therefore, that a single phosphor system that contained the same two chemical compounds as hosts and the same activator material would be an advancement in the art because one phosphor system provides a range of emission colors throughout a substantial portion of the visible spectrum and furthermore, the specific phosphors desired such as blue, green and red-emitting phosphors are brighter than many similar phosphor materials.

SUMMARY OF THE INVENTION

In accordance with one aspect of this invention there is provided a novel cathodoluminescent phosphor composition that emits light throughout a substantial portion of the visible spectrum that consists essentially of a zinc sulfide and cadmium sulfide host material in weight ratios of zinc to cadmium of from about 2:98 to about 98:2 and as an activator material consisting essentially of from about 50 to about 300 parts per million by weight of silver and from about 75 to about 600 parts per million by weight of aluminum.

BRIEF DESCRIPTION OF THE DRAWINGS

FIG. 1 is a graph that indicates the color and brightness of some of the phosphors of this invention as compared with ZnS and CdS phosphors having the same level of silver and aluminum as activator materials.

DESCRIPTION OF THE PREFERRED EMBODIMENTS

For a better understanding of the present invention, together with other and further objects, advantages and capabilities thereof, reference is made to the following disclosure and appended claims in connection with the above description of the drawing and of some of the aspects of the invention.

The cathodoluminescent phosphor compositions of the present invention are of the zinc cadmium sulfide type that luminesce under cathode ray excitation throughout a substantial portion of the visible spectrum. In the compositions of this invention the activator material is a combination of silver and aluminum in the amounts hereinafter specified. The brightness of the phosphors of this invention is unexpectedly better than similar materials. For example, mixtures of zinc sulfide and cadmium sulfide as host activated by the activator material containing silver and aluminum yield a higher brightness than would be expected from the brightness of zinc sulfide and cadmium sulfide alone when each are co-activated by silver and aluminum. Additionally, the activator material containing silver and aluminum gives an appreciable increased brightness as compared with activator material containing only silver or aluminum. The four component system of this invention, that is, zinc sulfide, cadmium sulfide, silver and aluminum within the amounts of each component hereinafter disclosed, yields a brighter cathodoluminescent phosphor composition than combinations of the same components in a three component system. Furthermore, the phosphors of this invention are brighter than other four component systems such as where chloride is substituted for aluminum.

The host is as previously mentioned, zinc sulfide and cadmium sulfide. The matrix or host can be mixtures containing weight ratios of zinc to cadmium of from about 2:98 to about 98:2. The particular ratio chosen will be dependent upon the color of emission that is desired. As the ratio of zinc to cadmium increases, the color of the emission shifts from red to blue across the visible spectrum. Particular ratios within the range specified yield compositions that are especially preferred for certain uses. For example, as will be described in more detail hereinafter, the compositions that have a zinc to cadmium ratio of from about 90:10 to about 97:3 are extremely bright blue-emitting phosphors that have excellent properties for the blue component in color television. These materials have brightness greater than 130 percent of the silver-activated zinc sulfide, a phosphor heretofore used in color television. The amounts of elements in the activator material of this invention are from about 50 parts per million to about 300 parts per million of silver and from about 75 parts per million to about 600 parts per million of aluminum, each based upon the weight of the host. Although the amount of aluminum used can vary from about 75 ppm to about 600 ppm by weight based upon the weight of the host, it is preferred to use from about 75 to about 300 ppm of aluminum in most instances. Use of lower than about 75 ppm or greater than about 600 ppm of aluminum or lower than about 50 ppm or greater than 300 ppm of silver tends to decrease or quench the brightness of the composition, therefore are to be avoided. It is possible by this invention to obtain exact color of emission that is desired. For example, if the exact color is relatively unimportant, such as in a single color display, one can choose the Zn:Cd ratio and the amount of activator material will be adjusted within the ranges heretofore specified to achieve maximum brightness. If exact color requirements are necessary, the $x$ and $y$ color coordinates can be shifted by adjusting the ratio of Zn to Cd and by adjusting levels of silver and aluminum. One skilled in the art can select the desired amount from the detailed description given herein.

The phosphor compositions of this invention can be prepared by mixing together the desired ratios of zinc sulfide and cadmium sulfide and the desired amount of silver and aluminum. To insure a relatively uniform mixture of the four components, it is desirable to form the mixture in a slurry media such as water, acetone and the like, then dry the resulting uniform mixture. It is generally preferred to use as a source of the activator materials silver and aluminum salts such as nitrates that have a fugitive anion, that is, one that will be evolved during the heating step that is conducted at from about 900° C. to about 1,250° C. Other methods of preparation of the mixture of the four components can be used, such as dry mixing, as long as a relatively uniform mixture can be attained. After the relatively uniform mixture is obtained, the mixture is heated at from about 900° C. to about 1,250° C. for about 1 hour in a non-oxidizing atmosphere that is free of other contaminants that can influence the emission characteristics of the resulting phosphors, such as other metals and halogens. One of the preferred atmospheres is a hydrogen sulfide.

As heretofore mentioned, one of the preferred embodiments is a blue-emitting phosphor composition. This phosphor composition consists essentially of a zinc-cadmium sulfide host having a ratio of zinc to cadmium of from about 90:10 to about 97:3 and an activator material having from about 100 to about 300 ppm of silver and from about 75 to about 150 ppm of aluminum. A relatively uniform host material and the activator material is prepared by methods heretofore described. In the manufacture of the blue-emitting phosphors of this invention, heating temperatures of from about 1,050° C. to about 1,150° C. are preferred to obtain the desired particle size distribution. As previously mentioned, in some cathode ray devices such as in color picture tubes, the exact color, generally measured by chromaticity coordinates, is important. For the blue-emitting phosphors, the zinc to cadmium ratio can vary from about 97:3 to about 90:10. It has been found that the $x$ color coordinate will decrease bout 0.001 unit per percent increase in cadmium content while the y color coordinate will increase about 0.003 units per percent increase in cadmium content. Also, the level of silver has been found to have no appreciable effect upon the $x$ coordinate within the useful range; however, an increase of about 50 ppm in the level of silver increases the y color coordinate about 0.001 units. The level of the aluminum does not have an appreciable effect upon the color of the phosphor; therefore, the range of from about 75 ppm to 150 ppm yield the brightest blue-emitting phosphors without an excessive decay time. The blue-emitting phosphor compositions of this invention can be varied within the ranges of Zn to Cd and levels of silver to yield a composition having chromaticity coordinates of $x$ from about 0.136 to about 0.146 and y from about 0.060 to about 0.080.

Additionally, as heretofore mentioned, an additional preferred embodiment is a green-emitting phosphor composition. The green-emitting phosphor compositions consist essentially of a host having zinc to cadmium weight ratio of from about 55:45 to about 65:35 and an activator material having from about 75 to about 300 ppm of aluminum and from about 50 ppm to about 300 ppm of silver. A zinc to cadmium weight ratio of about 60:40 is preferred. Firing temperatures of from about 1,050° C. to about 1,150° C. are generally used. The emission color of the green-emitting phosphors of this invention is effected by the ratio of zinc to cadmium and the level of silver and aluminum. While in the blue-emitting phosphor the zinc to cadmium ratio did not change the $x$ color coordinate rapidly with increased cadmium content, in the green-emitting phosphors the change is considerably greater. Within the 65:35 to 55:45 zinc to cadmium ratio range it has been found that the $x$ color coordinate increases about 0.015 units per percent increase in cadmium content. The y color coordinate increases about 0.005 units per percent increase in the 65:35 to 61:39 Zn:Cd ratio range, then remains relatively constant until a ratio of about 57:43 is reached, then decreased at a rate of about 0.004 units per percent of cadmium increase until the 55:45 ratio is reached. The levels of silver and aluminum have similar effects upon $x$ and y coordinates of the green-emitting phosphors as with the blue-emitting phosphors.

Additionally, red-emitting phosphor compositions consisting essentially of a host having a zinc to cadmium weight ratio of from about 15:85 to about 25:75 and an activator material having from about 100 to about 300 ppm of silver and from about 100 to about 300 ppm of aluminum are efficient phosphors. Firing temperatures of from about 950° C. to about 1,150° C. are generally used. Shifts in color coordinates due to changes in cadmium content and silver and aluminum are similar to those for the green-emitting phosphors.

To more fully illustrate the invention, the following detailed examples are presented. All parts, proportions and percentages are by weight unless otherwise indicated.

EXAMPLE I

Four blue-emitting zinc cadmium sulfide phosphor compositions, co-activated with about 300 ppm of aluminum and varying amounts of silver, are prepared by heating about 92 parts of zinc sulfide and 8 parts of cadmium sulfide, along with the corresponding amounts of silver and aluminum, in a hydrogen sulfide atmosphere at about 1,200° C. for about 1 hour.

The brightness of the phosphors prepared above is compared with a standard zinc sulfide currently used in color television that is activated with silver and co-activated with chloride ions. Chromaticity coordinates ($x$ and y) of the emission when excited by cathode rays are taken for all compositions. The results are shown below:

TABLE I

| Sample | Silver (ppm) | % Brightness | Chromaticity Coordinates | |
|---|---|---|---|---|
| | | | x | y |
| Standard (ZnS) | 200 | 100 | .138 | .061 |
| 1 | 50 | 115 | .137 | .069 |
| 2 | 100 | 132 | .137 | .067 |
| 3 | 150 | 136 | .136 | .068 |
| 4 | 200 | 119 | .136 | .069 |

The above results show a sizeable increase in brightness over the industry standard blue-emitting phosphor. The chromaticity coordinates are within acceptable limits for the blue component of color television.

EXAMPLE II

Samples of additional blue-emitting phosphors are prepared in essentially the same manner as in Example I except that the heating temperature is varied. One group prepared by heating at 1,200° C. and another group of samples are prepared by heating at 1,050° C. The particle size is controlled by size of the original zinc sulfide and temperature control. Higher temperatures generally yield larger particle sizes of phosphors. Brightness measurements and chromaticity measurements are taken when the compositions are subjected to cathode ray excitation. The standard is a silver activated zinc sulfide as in Example I. Results appear following:

TABLE II

| Particle Size (Microns) Sample No. | Heating Temperature(°C) | % Brightness (% of Standard) | Chromaticity Coordinates | |
|---|---|---|---|---|
| | | | x | y |

| Standard | — | — | 100 | .146 | 0.067 |
|---|---|---|---|---|---|
| 1 | 9.0 | 1200 | 177 | .144 | 0.066 |
| 2 | 11.0 | 1200 | 185 | .144 | 0.064 |
| 3 | 12.5 | 1200 | 180 | .144 | 0.063 |
| 4 | 6.1 | 1050 | 191 | .142 | 0.072 |
| 5 | 7.9 | 1050 | 192 | .144 | 0.071 |
| 6 | 9.5 | 1050 | 190 | .143 | 0.070 |

The above data indicates that it is possible to control the particle size over a relatively large range and achieve satisfactory brightness. This enables the phosphors to be applied to television viewing panels via either the "slurry" or "dusting" techniques that are commonly used in television manufacture.

EXAMPLE III

Various samples are prepared of phosphors using as an activator material having 150 ppm os silver and 300 ppm of aluminum. The zinc to cadmium ratio is varied from 0:100 to 100:0 as shown in FIG. 1. It is to be noted that mixtures of cadmium sulfide and zinc sulfide have significantly higher brightness than either zinc sulfide or cadmium sulfide alone even when the same activator material is used.

In FIG. 1 the color of emission is dependent upon the zinc to cadmium ratio. As can be appreciated, one desiring a particular color can select the desired Zn to Cd ratio. As is shown in the other examples herein, each of the phosphors are brighter than similar phosphors heretofore known. In some cathode ray display devices such as single color display devices, the exact color is not extremely important. For example, if a yellow-green is the desired emission color, one can select a phosphor having a Zn:Cd ratio of from about 43:57 to about 55:45. If a yellow phosphor is desired, one can select a material having a Zn:Cd ratio of from about 45:55 to about 35:65. The cross hatched section shows the preferred ranges for the color television phosphors. It can be seen that through the visible spectrum from red to blue phosphor compositions of this invention can be obtained. As can be appreciated, the brightness of a phosphor having a given color of emission such as red, blue, green or the like is generally expressed as percent of a given standard since the brightness in foot lamberts varies depending upon the color of the emission. Additionally, the exact color is best expressed in terms of $x$ and $y$ color coordinates, however, the data expressed in FIG. 1 enables one skilled in the art to choose a particular phosphor for the desired use. The effect of different levels of silver and aluminum upon the color or colormates will be apparent from the other detailed examples herein.

EXAMPLE IV

A green emitting zinc cadmium sulfide phosphor is prepared by forming a mixture of a host material having a zinc to cadmium weight ratio of about 60:40 and a sufficient amount of a source of an activator material to yield a uniform mixture having about 200 ppm of silver and about 200 ppm of aluminum. The material is heated to a temperature of about 1050° C. for about 1 hour in a hydrogen sulfide atmosphere. The brightness of the resulting green-emitting phosphor under cathode ray excitation is about 110 percent when compared with a green-emitting silver activated zinc cadmium sulfide used in color television taken as 100 percent. The color coordinates of the phosphors are essentially the same.

EXAMPLE V

A zinc cadmium sulfide host having a zinc to cadmium weight ratio of about 20:80 is mixed with a sufficient amount of an activator to yield a uniform mixture having about 175 ppm of silver and about 150 ppm of aluminum. The material is heated to a temperature of about 1050° C. for about 1 hour in a hydrogen sulfide atmosphere. The resulting red-emitting phosphor has a brightness under cathode ray excitation of about 130 percent when compared with a (ZnCd) S:AgCl red-emitting phosphor similar to that disclosed in U.S. Pat. No. 2,991,383 taken at 100 percent. Color coordinates of the two phosphors are essentially equal.

EXAMPLE VI

Blue-emitting phosphors are prepared as in Example I except that 150 ppm of silver is used and the level of aluminum is varied. The brightness of the phosphors under cathode ray excitation is compared with a blue-emitting silver activated zinc sulfide phosphor taken as 100 percent. The results of the comparative brightness and x and y chromaticity coordinates is shown in Table III below.

TABLE III

| Sample | Aluminum (ppm) | % Brightness | Chromaticity Coordinates | |
|---|---|---|---|---|
| | | | x | y |
| Standard (ZnS) | 200 | 100 | .151 | .049 |
| 1 | 25 | 125 | .146 | .055 |
| 2 | 75 | 185 | .144 | .062 |
| 3 | 125 | 188 | .144 | .061 |
| 4 | 175 | 180 | .145 | .060 |
| 5 | 225 | 180 | .145 | .062 |

The above data indicates that at 75 ppm of aluminum above that the materials produced are acceptable as blue-emitting color television phosphors. Similar results are achieved when levels of aluminum are increased up to 600 ppm however, some increased decay time is noted, therefore, levels above about 300 ppm are not preferred for most color television phosphors.

While there have been shown and described what are at present considered to be the preferred embodiments of the invention, it will be obvious to those skilled in the art that various changes and modifications may be made therein without departing from the scope of the invention as defined by the appended claims.

We claim:

1. A cathodoluminescent phosphor composition consisting essentially of zinc cadmium sulfide host material having a weight ratio of zinc to cadmium from about 2:98 to 98:2 and an activator material consisting essentially of silver in amounts of from about 50 to about 300 parts per million and aluminum in amounts from about 75 to about 600 parts per million based on the weight of said host material.

2. A composition according to claim 1 wherein said weight ratio of zinc to cadmium is from about 55:45 to about 65:35 and said aluminum is from about 75 ppm to about 300 ppm.

3. A composition according to claim 1 wherein said weight ratio of zinc to cadmium is from about 25:75 to about 15:85 and said silver is from about 100 ppm to about 300 ppm and said aluminum is from about 100 ppm to about 300 ppm.

4. A composition according to claim 1 wherein said weight ratio of zinc to cadmium is from about 90:10 to about 97:3 and said silver is from about 100 ppm to about 300 ppm and said aluminum is from about 75 to about 150 ppm.

5. A composition according to claim 4 wherein the chromaticity coordinates are $x$ from about 0.136 to about 0.146 and $y$ from about 0.060 to about 0.080.

* * * * *